G. E. RHODES.
CYLINDER GRINDING DEVICE.
APPLICATION FILED JUNE 24, 1920.
1,382,319.
Patented June 21, 1921.
3 SHEETS—SHEET 2.
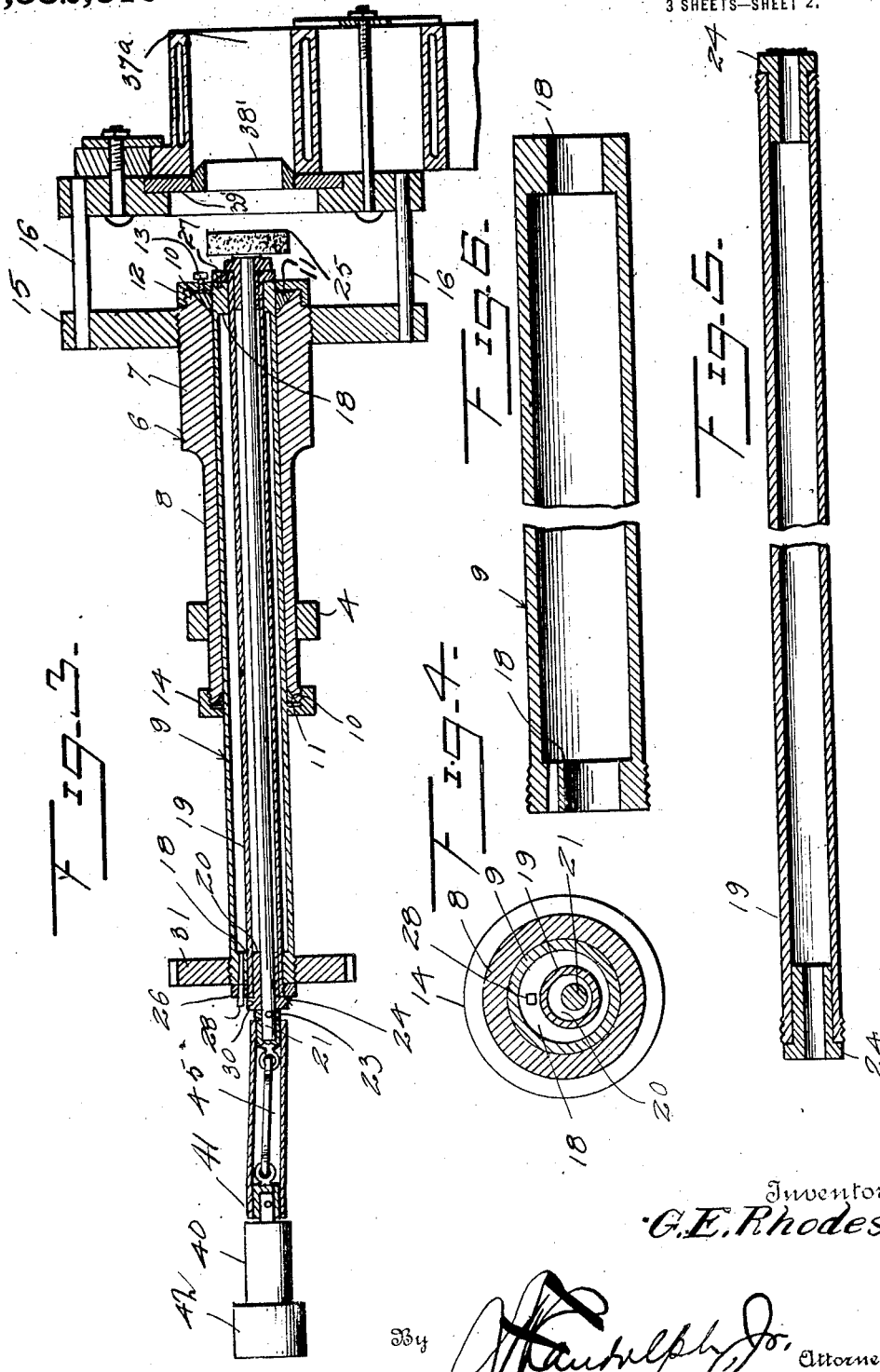
Inventor
G. E. Rhodes
By  Attorney

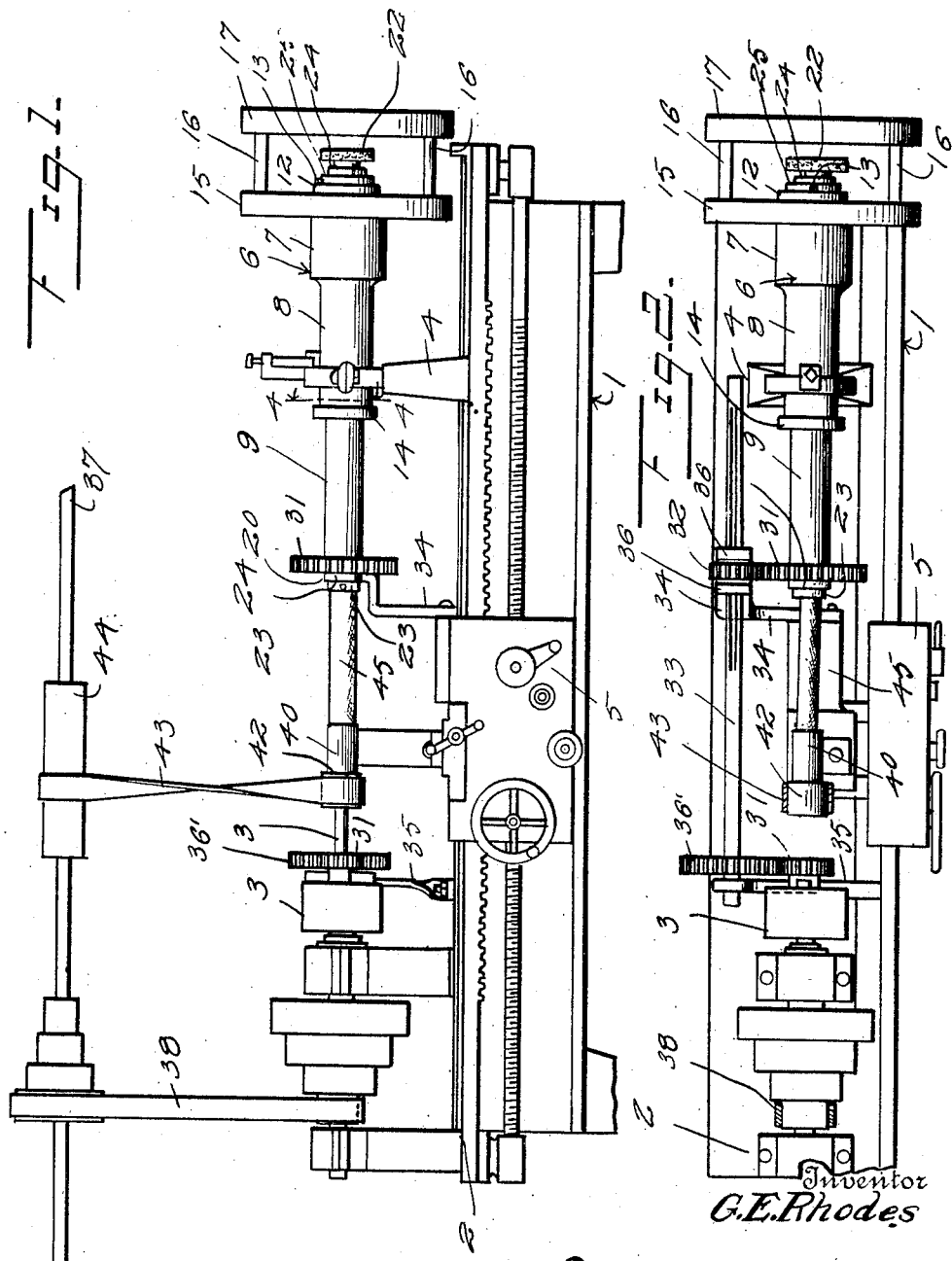

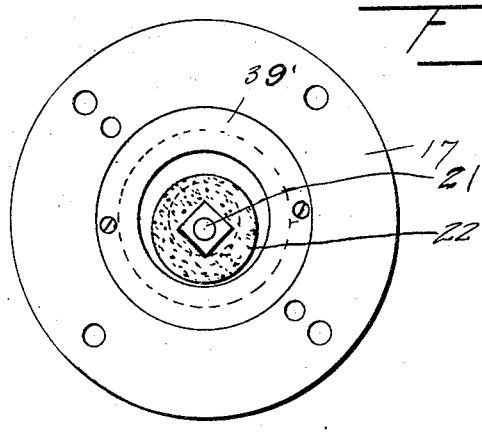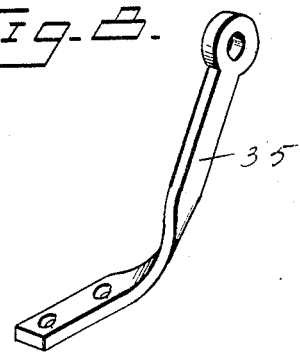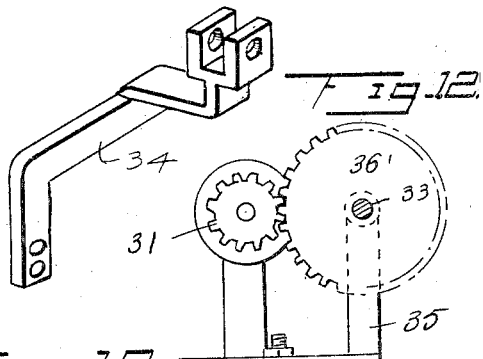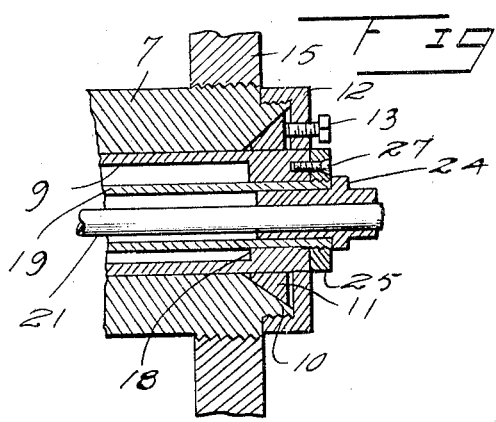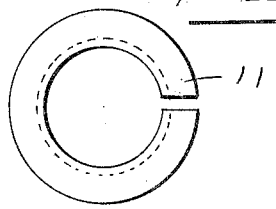

UNITED STATES PATENT OFFICE.

GEORGE E. RHODES, OF HAXTUM, COLORADO.

CYLINDER-GRINDING DEVICE.

1,382,319.  Specification of Letters Patent.  Patented June 21, 1921.

Application filed June 24, 1920. Serial No. 391,506.

*To all whom it may concern:*

Be it known that I, GEORGE E. RHODES, a citizen of the United States, residing at Haxtum, in the county of Phillips and State of Colorado, have invented certain new and useful Improvements in Cylinder-Grinding Devices; and I do hereby declare the following to be a full, clear, and exact description of the invention, such as will enable others skilled in the art to which it appertains to make and use the same.

This invention relates to new and useful improvements in attachments for lathes and has for its primary object the provision of a device of the above stated character, which may be supported and actuated by a lathe for shaping or truing the walls of cylinders of engines.

Another object of this invention is the provision of a rotating grinding element and means associated therewith for rendering said element an eccentric movement so that it will move into and out of engagement with the wall of a cylinder at any desired point for removing a raised or uneven surface from said wall.

A further object of this invention is the provision of means whereby the eccentric movement of the rotating grinding element may be varied for the purpose of regulating the grinding action of said grinding element on the wall of the cylinder.

A further object of this invention is the provision of means whereby the grinding element may be adjusted longitudinally or endwise of the cylinder so that any point between the ends of said cylinder may be shaped or trued.

A further object of this invention is the provision of means for rendering a rotating movement to the eccentric means and which is capable of permitting said eccentric means to be adjusted or moved longitudinally with the longitudinal adjustment of the grinding element.

A still further object of this invention is the provision of a cylinder grinding device of the above stated character which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a cylinder grinding device applied to a lathe and constructed in accordance with my invention, Fig. 2 is a top plan view illustrating the same, Fig. 3 is a horizontal sectional view taken through the entire attachment, Fig. 4 is a transverse sectional view taken on the line 4—4 of Fig. 1, Fig. 5 is a sectional view illustrating an inner eccentric sleeve, Fig. 6 is a similar view illustrating an outer eccentric sleeve, Fig. 7 is an end view illustrating the face plate and the grinding element, Fig. 8 is a perspective view illustrating one of the supporting brackets, Fig. 9 is a similar view illustrating another one of the supporting brackets.

Fig. 10 is a fragmentary sectional view illustrating the eccentric mounting of the shaft, Fig. 11 is an end view of a split cone shaped bearing, Fig. 12 is a detail sectional view illustrating the manner of adjustably connecting the brackets to the lathe table.

Referring in detail to the drawing, the numeral 1 indicates as an entirety a lathe having at one end the usual head stock 2 carrying the chuck 3, and located adjacent the other end the tail stock 4. A carriage 5 is mounted for longitudinal movement on the lathe 1 between the head and tail stocks.

The foregoing description relates to a well known construction of lathes to which my invention is applied.

A supporting sleeve or housing 6 is secured to the tail stock 4 and has an enlarged portion 7 and a reduced portion 8 and has rotatably mounted therein an outer eccentric sleeve 9 which projects beyond each end of the sleeve or housing 6. The sleeve 9 is arranged concentric with the housing or sleeve 6 and said housing or sleeve 6 has its ends beveled or cut-away as illustrated at 10 to receive substantially wedge-shaped rings 11 which are forced into engagement with the eccentric sleeve 9 to prevent chattering of said sleeve during the operation of the device. A clamping ring 12 is threaded to the enlarged end of the supporting housing or sleeve 6 and is provided with set screws 13 adapted to force the packing ring inwardly of said housing or sleeve 6 while the other packing 11 is secured in place by a cap 14 threaded to the reduced end 8 of said housing or sleeve 6. The packing rings besides being of wedge-shape in cross section are of annular formation in outline and are split to permit expansion and contraction of said rings. The enlarged portion of the sleeve or housing 6 has threaded thereon a supporting flange 15 to which are secured circularly arranged and horizontally disposed supporting rods 16 which support a face plate 17 in spaced relation to the flange 15 and to the enlarged end 7 of the housing or sleeve 6.

The eccentric sleeve 9 has in each end an eccentric bearing 18 which supports an inner eccentric sleeve 19 that projects beyond the ends of the outer eccentric sleeve 9 and is provided in its ends with eccentric bearings 20 that rotatably support a shaft 21 which projects beyond the ends of said inner eccentric sleeve 19 and also extends through an opening in the face plate 17 and has secured thereto a grinding element 22 of circular formation. The shaft 21 is held against endwise movement within the bearings 20 by collars 23 which permit said shaft to have free rotation within said inner eccentric sleeve 19.

The eccentric bearings 20 have formed on their outer ends annular flanges 24 that engage the end of the inner eccentric sleeve 19. The ends of the eccentric sleeve 19 have threaded thereon collars 25 and 26 which abut the end of the outer eccentric sleeve 9. The collar 25 is secured to the end of the outer eccentric sleeve 9 by a counter-sunk set screw 27 which is turned against said eccentric sleeve 9 to form a driving connection between the inner and outer eccentric sleeves. The collar 26 is provided with a wedge-shaped opening to receive a wedge 28 adapted to extend into an opening formed in the other end of the outer eccentric sleeve 9 and is capable of permitting the inner eccentric sleeve 19 to be adjusted within the outer eccentric sleeve 9 for the purpose of varying or adjusting the eccentricity of the shaft 21 in respect to the supporting housing or sleeve 6 and also the face plate 17. The flange 24 of one of the eccentric bearings 20 of the inner eccentric sleeve 19 is provided with a recess 30 in which a suitable instrument may be inserted for turning the inner eccentric sleeve 19 in relation to the eccentric sleeve 9 when the collars 25 and 26 have been detached from the ends of the outer eccentric sleeve 9.

A gear 31 is secured to one end of the outer eccentric sleeve 9 and meshes with a pinion 32 splined to a shaft 33 which is journaled in brackets 24 and 35 respectively. The bracket 34 is secured to the carriage 5 of the lathe while the bracket 35 is secured to the lathe adjacent the head stock 2. The bracket 34 carries spaced bearings 36 which rotatably support the shaft 33 and said bearings are placed on each side of the pinion 32 to prevent said pinion from moving out of mesh with the gear 31 during the longitudinal movement of the shaft 21 and the inner and outer eccentric sleeves 19 and 9. The other end of the shaft 33 has secured thereto a gear 36' which meshes with the pinion 37 secured to the chuck 3 and said chuck 3 is driven from a power shaft 37' by an endless belt 38, thus it will be seen that the outer eccentric sleeve 9 will be rotated within the housing or sleeve 6 and that the inner eccentric sleeve 19 rotates with the outer eccentric sleeve 9 giving the shaft 21 an eccentric motion.

A shaft 39 is journaled in a bearing 40 carried by the carriage 5 and is held against endwise movement in said bearing by a collar 41 and a pulley 42. The pulley 42 is connected to the power shaft 37 by an endless belt 43 and the pulley 44 that is mounted on the power shaft 37 is of elongated formation to permit the belt 43 to shift longitudinally during the longitudinal movement of the carriage 5. The shaft 33 is connected to the end of the shaft 21 by a universal joint 45, thus it will be seen that the grinding element 22 is given a continuous rotation from the power shaft 37 and the universal joint permits the shaft 21 to have an eccentric motion in relation to the shaft 33.

A cylinder block 37ª is supported against the face plate 17 in any desired manner or as shown in Fig. 3 and the grinding element 22 is disposed within the cylinder and is given an eccentric motion to the inner and outer eccentric sleeves 19 and 9 during their rotation and also given a continuous rotation about its own axis by the belt 43 so that high or irregular portions on the wall of the cylinder can be readily removed owing to the rotation of the grinding element and the eccentric motion thereof, also it is to be noted that the cylinder can be trued or shaped from one end to another by the longitudinal adjustment of both the shaft 21 and the eccentric sleeves 9 and 19.

In order to properly aline a cylinder of a cylinder block with the face plate 17, an alining ring 38' is provided in the face plate and fits in the cylinder as shown in Fig. 3 and after the cylinder block has been attached to the face plate 17, the ring 38 is then removed, to permit the grinding element 25 to move freely through the face plate. Several alining rings of different sizes may be provided for accommodating cylinders of different sizes and several retaining plates 39' may be provided of different sizes to correspond with the different alining rings. The retaining plate 39' as shown in Fig. 3 is detachably secured to the face plate 17 by fasteners.

While I have shown and described the preferred embodiment of my invention, it will be understood that minor changes in construction, combination, and arrangement of parts may be made without departing from the spirit and scope of the invention as claimed.

Having thus described my invention, what I claim is:

1. In combination with a lathe having a power driven chuck and a carriage, a housing secured to the lathe, a sleeve journaled in said housing, a second sleeve eccentrically mounted in the first sleeve, a shaft eccentrically mounted in said second sleeve, a grinding element secured to said shaft, means for rotating the shaft, and means for rotating the first sleeve by the chuck.

2. In combination with a lathe having a power driven chuck and a carriage, a housing secured to the lathe, an outer sleeve journaled in said housing, an inner sleeve eccentrically mounted within the outer sleeve and fixed for rotation therewith, a shaft eccentrically journaled within the inner sleeve, a grinding element secured to said shaft, means connecting said shaft to the carriage, and means connecting the outer sleeve with the chuck.

3. In combination with a lathe having a power driven chuck and a carriage, a housing secured to the lathe, an outer sleeve rotatably and slidably mounted within said housing, an inner sleeve eccentrically mounted within the outer sleeve and capable of adjustment with relation to the outer sleeve, means securing the inner and outer sleeves together, a shaft eccentrically journaled in the inner sleeve, a grinding element secured to said shaft, means connecting the shaft to the carriage to move said shaft and sleeve endwise longitudinally, means for rotating said shaft, means for connecting the outer sleeve to the chuck for rotating said sleeve to render an eccentric motion to the shaft.

4. In combination with a lathe having a power driven chuck and a movable carriage, a housing secured to the lathe, an outer sleeve slidably and rotatably mounted within said housing, an inner sleeve eccentrically mounted within the outer sleeve, means securing the inner and outer sleeves together and capable of permitting said sleeves to be adjusted in relation to each other, a shaft eccentrically mounted in the inner sleeve, a grinding element secured to said shaft, means preventing said shaft from having endwise movement in relation to the sleeve, means connecting the shaft to the carriage, means for rotating the shaft, and means establishing a driving connection between the chuck and the sleeve to render said sleeve a rotative motion for causing said shaft to have an eccentric motion.

5. In combination, a lathe having a power driven chuck and a movable carriage, a housing secured to the lathe, an outer sleeve rotatable and slidably mounted in said housing, an inner sleeve eccentrically mounted in the outer sleeve, means establishing a driving connection between said sleeves and capable of permitting the sleeves to be adjusted in relation to each other, a shaft extending through the inner sleeve, means eccentrically mounting the shaft within the inner sleeve, a grinding element secured to said shaft, means preventing said shaft from having endwise movement in relation to the sleeves, a shaft journaled to the carriage, universal means connecting the shafts, means for connecting power to the second named shaft, and means establishing a driving connection between the chuck and the outer sleeve.

6. In combination, a lathe having a power driven chuck and a movable carriage, a supporting means secured to the lathe, an outer sleeve rotatably and slidably mounted in said supporting means, an inner sleeve eccentrically mounted within the outer sleeve, a shaft eccentrically mounted within the inner sleeve, a grinding element secured to said shaft, a second shaft journaled to the carriage, universal means connecting said shafts, and an adjustable means establishing a driving connection between the chuck and the outer sleeve.

7. In combination, a lathe having a power driven chuck and a movable carriage, supporting means secured to the lathe, an outer sleeve slidably and rotatably mounted in said supporting means, an inner sleeve eccentrically mounted within the outer sleeve, a shaft eccentrically mounted within the inner sleeve, a grinding element secured to the shaft, means limiting the movement of the shaft endwise of said sleeve, a second shaft journaled to the carriage, a universal joint connecting the shafts, power means connected to the second shaft for rotating the grinding element, brackets secured to the carriage and to the lathe, a third shaft journaled in said brackets, means connecting the third shaft to the power driven shaft, a pinion splined to the third shaft, and a gear secured to the outer sleeve and in mesh with the pinion.

8. In combination, a lathe having a power driven chuck and a movable carriage, supporting means secured to said lathe, an outer sleeve slidably and rotatably mounted within the supporting means, an inner sleeve eccentrically mounted in the outer sleeve, a shaft eccentrically mounted within the inner sleeve, grinding means secured to said shaft, means connecting the shaft with the carriage, means connecting said means with a power source, means establishing a driving and adjustable connection between the outer sleeves and the chuck, a flange secured to the supporting means, rods connected to said flange, a face plate secured to said rods and having an opening to permit the shaft to extend therethrough.

In testimony whereof I affix my signature in presence of two witnesses.

GEORGE E. RHODES.

Witnesses:
J. BANISTER,
HENRY W. BENTSON.